(12) United States Patent
Miller

(10) Patent No.: US 6,249,004 B1
(45) Date of Patent: Jun. 19, 2001

(54) INORGANIC CRYSTAL BASED COMPOSITE MATERIAL HIGH DOSE DOSIMETER AND METHOD OF USING SAME

(75) Inventor: Steven Donald Miller, Richland, WA (US)

(73) Assignee: Sunna Systems Corp., Richland, WA (US)

( * ) Notice: Subject to any disclaimer, the term of this patent is extended or adjusted under 35 U.S.C. 154(b) by 0 days.

(21) Appl. No.: 09/169,108

(22) Filed: Oct. 7, 1998

(51) Int. Cl.$^7$ ....................................... G01T 3/06
(52) U.S. Cl. ................... 250/474.1; 250/484.5; 376/247
(58) Field of Search ............... 250/484.5, 474.1; 376/247

(56) References Cited

U.S. PATENT DOCUMENTS

| | | |
|---|---|---|
| 4,980,118 | * 12/1990 | Fero et al. ................ 376/247 |
| 5,272,348 | 12/1993 | Miller . |
| 5,567,948 | 10/1996 | Miller . |
| 5,569,927 | 10/1996 | Miller . |
| 6,140,651 | * 10/2000 | Justus et al. ............. 250/484.5 |

OTHER PUBLICATIONS

W. L. McLauglin, et al., "Electron and Gamma–Ray Dosimetry Using Radiation Induced Color Centers in LiF", Radiat. Phys. Chem. vol. 14, pp. 467–480. Peragamon Press Ltd. 1979.

A. Waibel, et al., "A Method of Individual Calibration of LiF Optical Absorption Dosemeters.", Radiation Protection Dosimetry, No. 1/4 pp. 581–583 (1993) Nuclear Technology Publishing.

* cited by examiner

Primary Examiner—Constantine Hannaher
Assistant Examiner—Andrew Israel

(57) ABSTRACT

The present invention is a composite material containing a mix of dosimeter material powder and a polymer powder wherein the polymer is transparent to the photons of wavelengths absorbed by the dosimeter material powder. The present method includes a method of interrogation that is substantially independent of dose rate and temperature. Interrogation is done with spectrophotometric measurements using ultraviolet or visible light.

10 Claims, 5 Drawing Sheets

INORGANIC CRYSTAL BASED COMPOSITE MATERIAL HIGH DOSE DOSIMETER AND METHOD OF USING SAME

FIELD OF THE INVENTION

The present invention relates generally to a composite material and its use as a high dose dosimeter typically used in the field of ionizing radiation processing and sterilization. More specifically the invention is the incorporation of an inorganic dosimeter material powder into a polymer or a liquid with subsequent formation of composite material dosimeters.

In this patent, the term dosimeter is used to indicate a device that incorporates dosimeter material that absorbs ionizing radiation and is subsequently interrogated for indication of ionizing radiation dose using the methods of either optical absorption and/or optical reflectivity.

BACKGROUND OF THE INVENTION

The present industrial standard high dose dosimeter is a plastic composite dosimeter comprising a mixture of a polymer and an organic dye of various compositions that has the property of absorbing optical photons (UV or visible) in proportion to the amount of ionizing radiation dose. The two primary commercial vendors are Far West (Goleta, Calif.) and Harwell (United Kingdom). While suitable to their purpose, these two manufacturer's products suffer from dose rate dependency, dependency of irradiation temperature during exposure, post-irradiation temperature effects, pre-concurrent-, and post irradiation humidity effects, light-induced response changes, and handling problems that make the dose determination a difficult process. The currently commercially available high dose dosimeters are analyzed by placing the polymer dosimeters within a spectrophotometer that measures optical absorption. One or more wavelengths are used to determine the ionizing radiation dose.

In addition, W. L. McLaughlin et. al. in their paper ELECTRON AND GAMMA-RAY DOSIMETRY USING RADIATION-INDUCED COLOR CENTERS IN LiF, *Radiat. Phys. Chem.* V 14. Pp. 467–480, 1979 describe a method for using single crystals of lithium fluoride as dosimeters. In this method, ionizing radiation creates F-centers in the lithium fluoride crystals. The amount of ionizing radiation received by large single crystals of lithium fluoride has been shown to be related to the absorption of light at a wavelength corresponding to the F-center absorption. In the case of lithium fluoride, the F-center absorption wavelength is in the ultraviolet range with a $\lambda_{max}$ of about 247 nm. While this method has minimal irradiation temperature and dose rate dependence, it relies on a single crystal. Despite efforts to make uniform single crystals, the single crystals reported by McLaughlin were not uniform in their optical absorption response to ionizing radiation and therefore would have to be individually calibrated. Further, alkali halide crystals such as LiF are soft and easily scratched. Once scratched, the crystal is useless for optical measurements. Finally, polished single crystals are far too costly at $10 to $100 each to be used for routine high dose dosimetry.

In addition, A. Waibel et. al. in their paper A METHOD OF INDIVIDUAL CALIBRATION OF LiF OPTICAL ABSORPTION DOSEMETERS, *Radiation Protection Dosimetry* V 47 Pp. 581–583, 1993 describe a method for using single crystals of lithium fluoride as dosimeters at high dose and high temperature. This work validated the use of F-center absorption in single lithium fluoride crystals as a method of dosimetry. Waibel also validated the large (20%) coefficient of variation between the response of different crystals of LiF to the same ionizing radiation dose.

In addition, optically stimulated luminescent dosimetry as taught by Miller in U.S. Pat. Nos. 5,272,348; 5,567,948 and 5,569,927 utilizes M-center re-emission of a photon of longer wavelength than the interrogating photon. This dosimetry is subject to dose rate dependence and temperature effects at high doses which lessens it utility as a routine dosimeter in commercial practice for high dose dosimetry at doses greater than 10 kiloGray.

SUMMARY OF THE INVENTION

The present invention is based upon the discovery that certain plastic/dosimeter and liquid/dosimeter material combinations provide sufficient sensitivity that rapid readings (less than 10 sec) are possible and it is not necessary to remove the dosimeter material from the carrier liquid or plastic for purposes of interrogation. A composite material containing a dosimeter material powder mixed into a carrier can be molded, extruded, or otherwise formed into dosimeters of various shapes is described. Such dosimeter material powder is an inorganic material that exhibits F-center absorption of optical radiation between 200 and 700 nm when exposed to ionizing radiation. The carrier is non-opaque to the optical radiation absorbed by the ionizing radiation induced F-center in the dosimeter material powder. The carrier in the composite dosimeter can be a polymer or a liquid. When a polymer is used, the dosimeter can be made into any convenient shape. When a liquid is used as the carrier, the dosimeter can take the shape of any container. In the present invention, the absorption of light in a composite material dosimeter is used as the basis for the dosimetry.

In addition to traditional methods of transmission-absorption spectrophotometry, the dosimeter can be interrogated with a reflectometer that measures the optical reflection intensity. The greater the ionizing radiation-induced absorption, the less optical light is reflected back to the detector. The reflection method can be used as a quick screening tool to verify if a package has been irradiated or as a less precise (for example, 10% to 25% uncertainty) method of measuring dose. A possible application for such a screening tool is ionizing radiation indication labels for packages being processed with ionizing radiation. In a specific example of the present invention a LiF powder composite polymer dosimeter is quantified by measuring the amount of ultraviolet light absorption in a range of 200–300 nm with the peak of the absorption being measured at 240 nm using an uncalibrated spectrophotometer.

An advantage of the present invention is that multiple particles of the dosimeter material powder provide an integrated response with much less variation than a single crystal. Another advantage of the present invention is the discovery that optical reflection and/or absorption measurements are substantially independent of dose rate and temperature of irradiation.

The basis for this absorption technique is the fact that ionizing radiation exposure produces radiation-induced defects in crystalline solids (i.e. alkali-halides). These ionizing radiation-induced defects cause a characteristic optical absorption that depends upon the type of crystal being irradiated. In the case of LiF, an F-center is created that absorbs ultraviolet light in proportion to the about of ionizing radiation received. LiF and other crystals display monotonically increasing optical absorption with increasing ionizing radiation exposure. Virtually any crystalline solid will undergo some sort of optical absorption when irradiated with ionizing radiation. The temperature stability and light stability and the wavelength of the peak optical absorption are the major differences between the different crystals. At present, LiF powder is the preferred material for its stability, sensitivity, and economics. Other crystalline materials, such as NaCl, may also prove useful after further testing.

As used herein, the term optically transmissive includes a broad range of transmissivities from optically clear for the wavelengths of interest to optically translucent for the wavelengths of interest. Another term considered synonymous is non-opaque.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
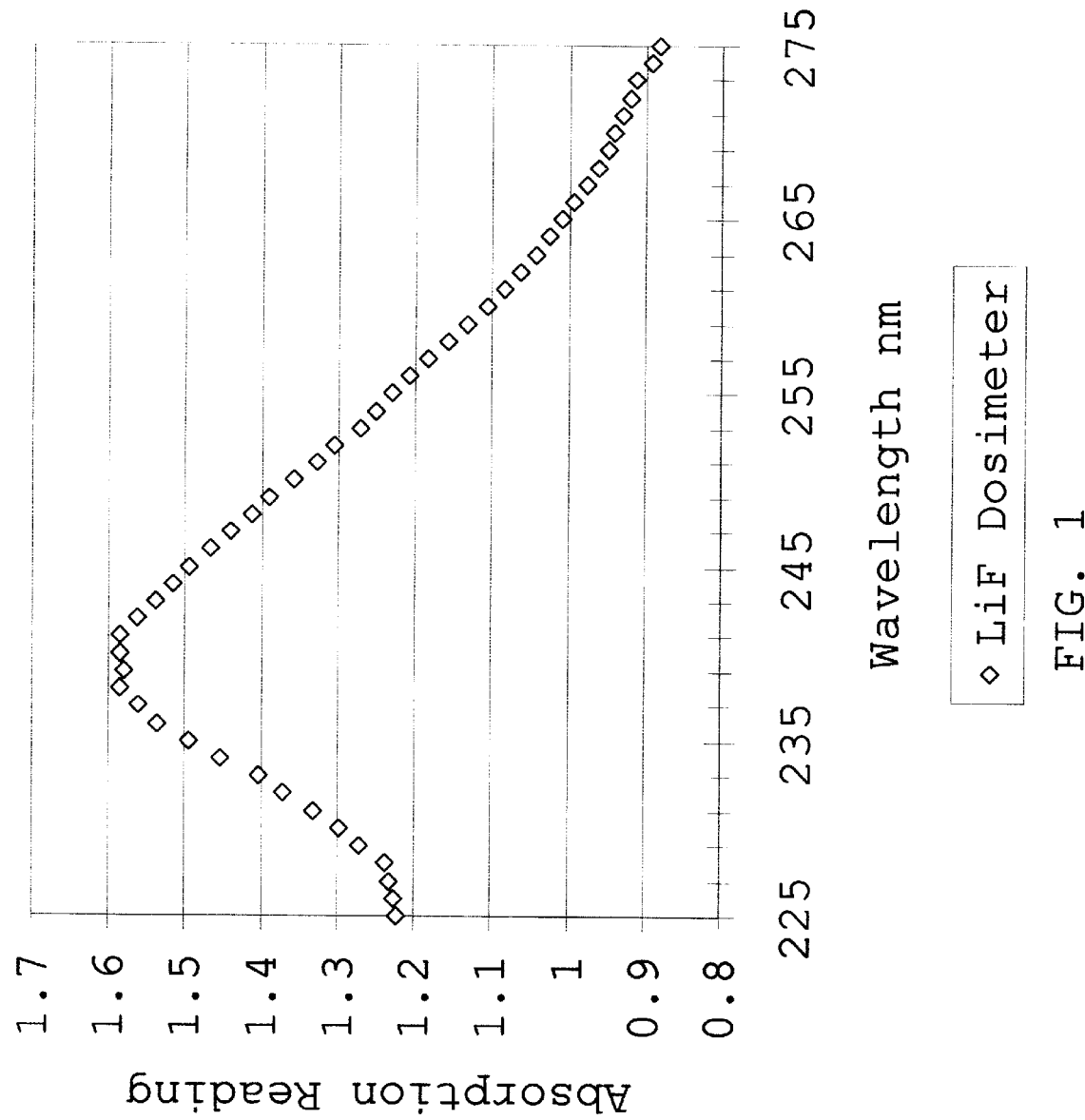
FIG. 1 is a graph of absorption of optical radiation versus wavelength for a range of ultraviolet wavelengths for a composite dosimeter.

The present invention is a dosimeter for measuring ionizing radiation exposure, the dosimeter having an amount of an optically transmissive metal-based crystalline compound powder dispersed throughout a volume of a carrier matrix. The carrier matrix can be comprised of a polymer or liquid which is substantially non-opaque to optical radiation at the wavelength corresponding to the F-center absorption of the crystalline powder and in which the crystalline powder will not substantially dissolve. According to the present invention, dose is measured by exposure of the dosimeter to a light in the ultraviolet to red (200 nm to 700 nm) that corresponds to an absorption center, such as an F-center, and measuring the light escaped from the dosimeter. FIG. 1 shows the absorption of a LiF and polyethylene composite dosimeter as a function of wavelength. The peak absorption at 240 nm corresponds to the F-band absorption. This method is operative as a means and/or method of making sensitive measurements of ionizing radiation dose less than about 100 Gray of ionizing radiation exposure up to and greater than 100 kiloGray. The illumination of the dosimeter with optical radiation corresponding to the F-center absorption of the crystalline solid does not typically stimulate photoluminescence.

The metal based crystalline compound powder is a crystalline compound wherein the term crystalline is defined as containing a regular solid structure or two or more chemical elements substantially stoichiometrically bonded together. The term substantially is used because there are occasionally excesses and deficiencies of one or the other element in a powder that are not strictly stoichiometric. There may be multiple atoms of one or both elements, but the compound still has the two chemical elements. The metal-based crystalline compound may be non-stoichiometrically doped with one or more additional element(s). Metal-based crystalline compounds are selected from the group of metal oxides and metal halides, or combinations thereof. Dopants may be any element(s) but are preferably selected from the group of manganese, dysprosium, titanium, magnesium, silicon and carbon.

The carrier matrix selected depends upon the wavelength of light used for interrogating the dosimeter material. It is preferred that the carrier be substantially optically transmissive or non-opaque to the photons from the interrogating light source. Substantially transmissive means at least 10% transmissive and more preferably at least 50% transmissive and most preferably at least 80% transmissive. Polymer matrices found to exhibit these characteristics for visible light interrogation, include for example, methyl-pentene (PTX), polyethylene, polypropylene, polycarbonate, polymethyl-methacrylate (PMMA) or Lucite, polystyrene, and most thermoset polymers. A polymer matrix found to exhibit these characteristics for ultraviolet light interrogation is polyethylene, fluoropolymers, for example, polytetrafluoroethylene (Teflon) and combinations thereof. Liquids found to exhibit the desired properties of optical non-opacity and immiscibility with crystalline solids include water, alcohols, alkanes, paraffin waxes, chlorocarbons and fluorocarbons. Any polymer may be a useful host for the LiF powder that permits good optical transmission in the ultraviolet range of 240–260 nm.

The proportions of dosimeter material powder and polymer matrix material may vary according to a particular dosimetric application. According to the present invention, a ratio of dosimeter material powder to carrier matrix material may range from about 0.1% by weight to about 40% by weight for mixture with polymers and about 0.1$ to about 80% by weight for liquids. Below about 0.1% by weight, there is insufficient amount of dosimeter material to provide sufficient signal for making readings especially at low doses. Above about 40% by weight, the mechanical properties of the polymer-based composite are reduced. Above 80% by weight, the optical properties of the liquid based composite may be reduced. A preferred range for polymer based composite dosimeters is for the crystalline solid to be from about 1% to about 30% by weight of dosimeter. A preferred range for the liquid based composite dosimeter is for the crystalline solid to be from about 5% to about 60% of the dosimeter by weight.

In addition, the dosimeter material powder particle size distribution may vary as well. Dosimeter material particle size may range from less than 1 $\mu$m to about 250 $\mu$m Above about 250 $\mu$m, it is difficult to achieve uniform dispersion in the polymer matrix. Thus, it is preferred that the dosimeter material particles are from about less than 1 $\mu$m to about 10 $\mu$m to provide satisfactory mixing or dispersion within the carrier matrix. Ideally, the more individual particles homogeneously distributed throughout the carrier matrix, the better. That is because each powder particle acts as an individual dosimeter. However, because it is impossible to make the number of photon absorption traps the same in each powder particle, it is necessary to have a statistically large number of powder particles in a dosimeter so that photon absorption for a given ionizing radiation dose is consistent from dosimeter to dosimeter within acceptable limits. It is preferred to be consistent with a deviation of one standard deviation from the mean of about a 5%, and more preferred to be consistent within about 3%, and most preferred to be consistent within less than 3%. This makes it possible to achieve greater uniformity between composite dosimeters than is possible between monolithic crystals of dosimeter material which exhibit a deviation from about 15% to 25% for LiF samples. By utilizing a polymer matrix, it is easier to form the dosimeter into a variety of shapes and sizes for example, single dosimeters, a linear tape for linear dose profiling, or a two-dimensional sheet for imaging purposes. Moreover, it is easier to use presently available miniature marking technology to place identifying marks on a polymer matrix dosimeter so that chain of custody is maintained without the need for a separate container. This is important for increasing reliability of measurements should the detection element become separated from its container.

By using a composite of alkali halide, preferably lithium fluoride, in a carrier matrix, such as polyethylene, as the dosimeter in combination with room temperature readout, an absorption-based measurement can be taken with standard spectrophotometric equipment that can yield a dosimetric measurement.

A preferred embodiment utilizes the F-center absorption of lithium fluoride crystalline powder mixed in a polyethylene polymer matrix. The absorption readings are calibrated to ionizing radiation dose and dosimetry estimates determined according to established standard procedures such as ASTM 1261-94. In addition to the dosimeter material, the dosimeter may have additional material; for example, packaging or labeling that does not provide any indication of ionizing radiation dose.

Method of Measuring Radiation Dose

According to the present invention, a method of measuring ionizing radiation dose has the steps of:

(a) exposing a dosimeter having a crystalline inorganic dosimeter material within a carrier matrix to ionizing radiation;

(b) illuminating the exposed dosimeter with an interrogating light of a wavelength corresponding to a radiation-induced absorption band of the crystalline dosimeter material; and (c) counting photons of the interrogating light that escape from the dosimeter. Interrogating light photons may escape by either transmission through or reflection from the dosimeter.

In a preferred embodiment, the carrier material is transparent to the interrogating light. Preferably, readings are obtained in less than about 10 sec, and more preferably less than about 5 sec, and most preferably less than about 1 sec.

Rapid readings are obtained by using a standard spectrophotometer.

EXAMPLE 1

Figure 2:
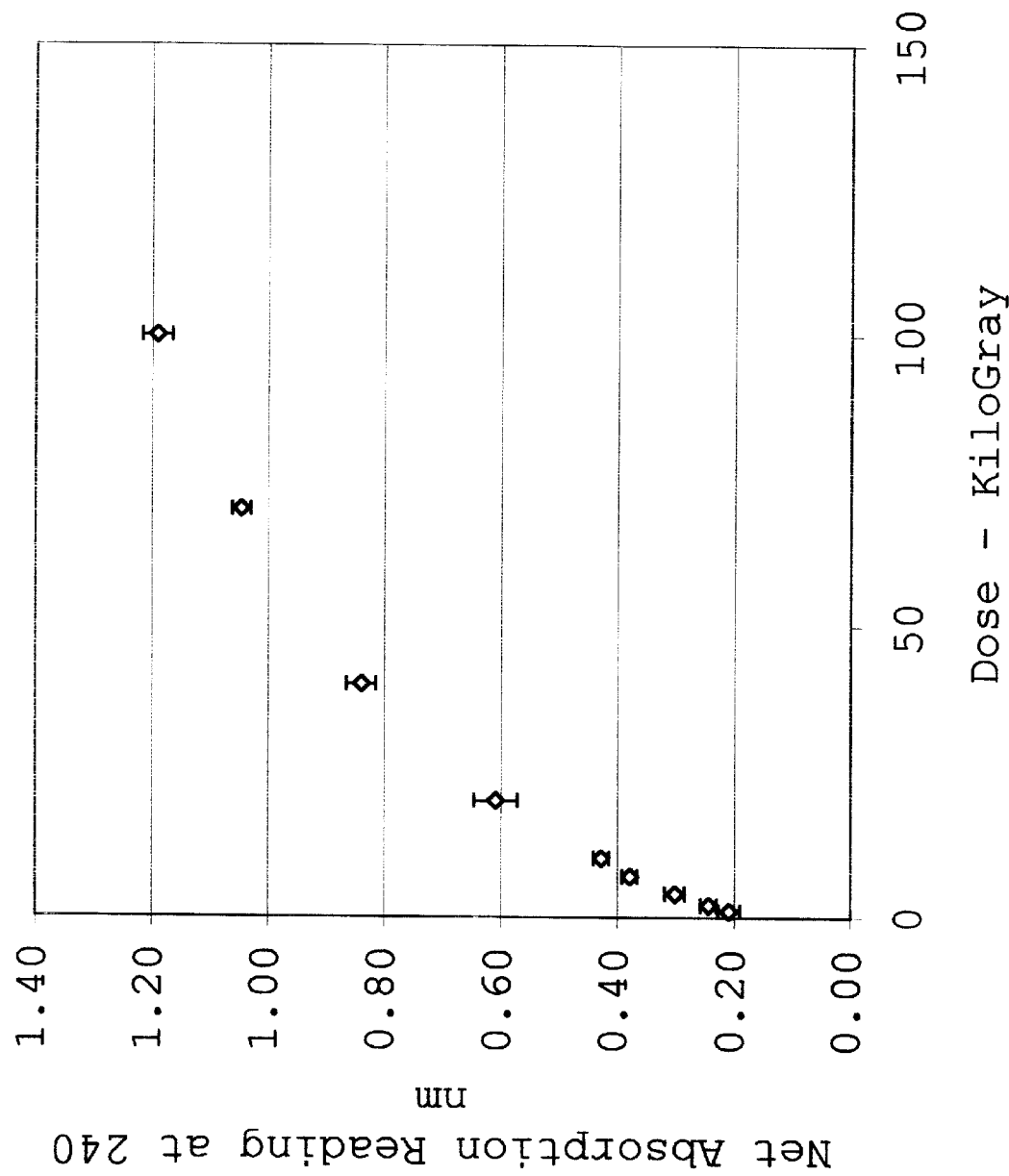
FIG. 2 is a graph of net absorption of optical radiation at approximately 240 nm versus ionizing radiation dose for a range of doses for a composite dosimeter.

An experiment was conducted to demonstrate the F-center absorption performance of a composite material dosimeter. The composite material dosimeter used to generate the data in the figures and examples was a mixture of LiF powder and linear low-density polyethylene. The mixture was 20% by weight LiF. The LiF particle size was less than 5 microns. Data were taken with a standard Perkin-Elmer Lambda 6 spectrophotometer. These dosimeters were irradiated to different doses using a uniform dose rate and a constant temperature of irradiation. FIG. 2 shows the absorption of ultraviolet light ($\lambda$=240 nm) as a function of dose delivered to a composite LiF and polyethylene dosimeter. There is a clear correlation between the absorbed dose and the absorption of ultraviolet light. The correlation is useful over a wide range of absorbed dose.

EXAMPLE 2

Figure 3:
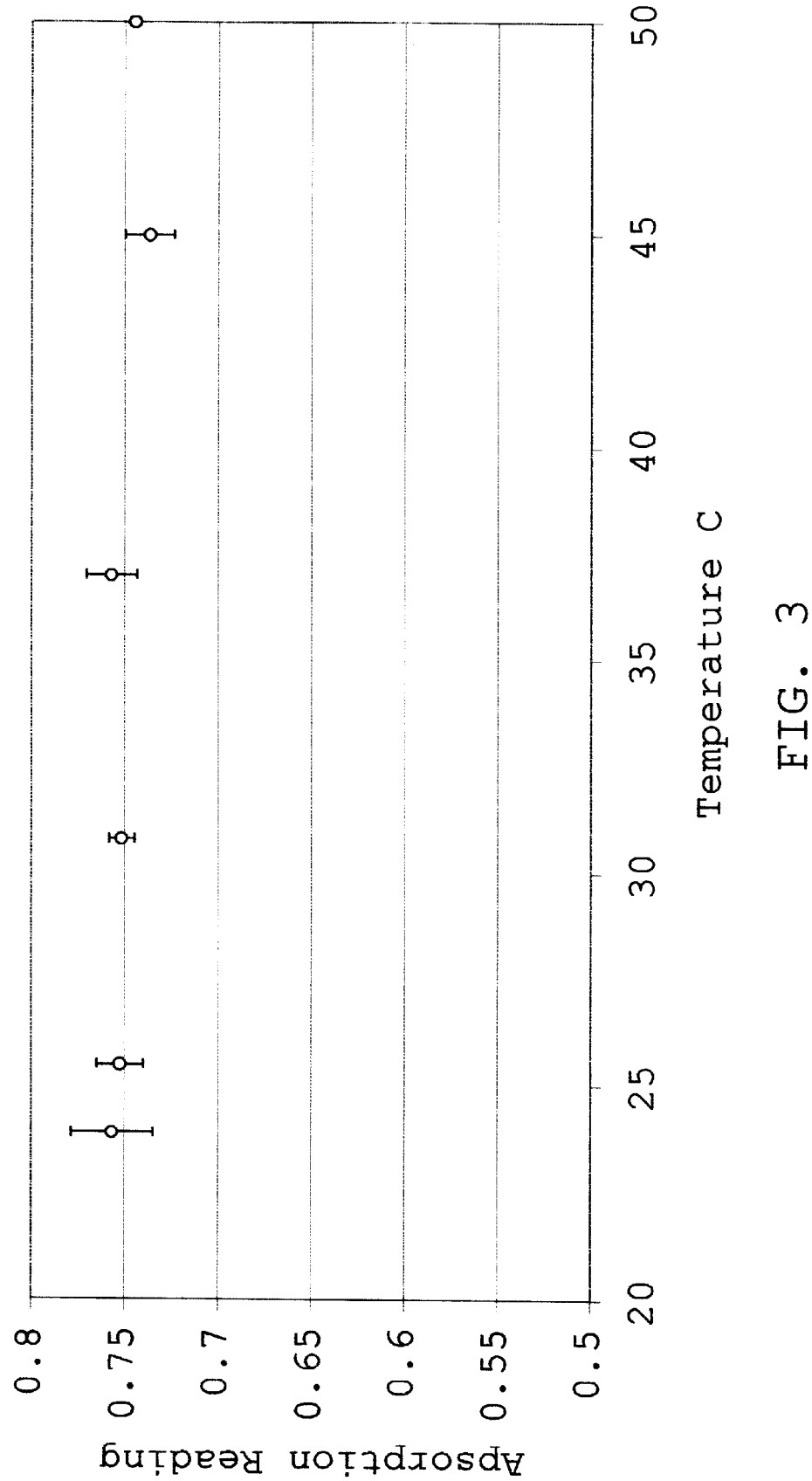
FIG. 3 is a graph of absorption of optical radiation at approximately 240 nm versus temperature at a set dose for a composite dosimeter.

FIG. 3 shows the absorption of ultraviolet light ($\lambda$=240 nm) as a function of the irradiation temperature at as set dose. Again, the dosimeter used was the composite LiF and polyethylene dosimeter described in Example 1. These dosimeters were irradiated at different temperatures using a uniform dose rate. FIG. 3 shows a no significant correlation between the temperature of irradiation and the absorption of ultraviolet light over a range of typical commercial irradiation temperatures. Any uncertainty or variation due to temperature is within about 2%.

EXAMPLE 3

Figure 4:
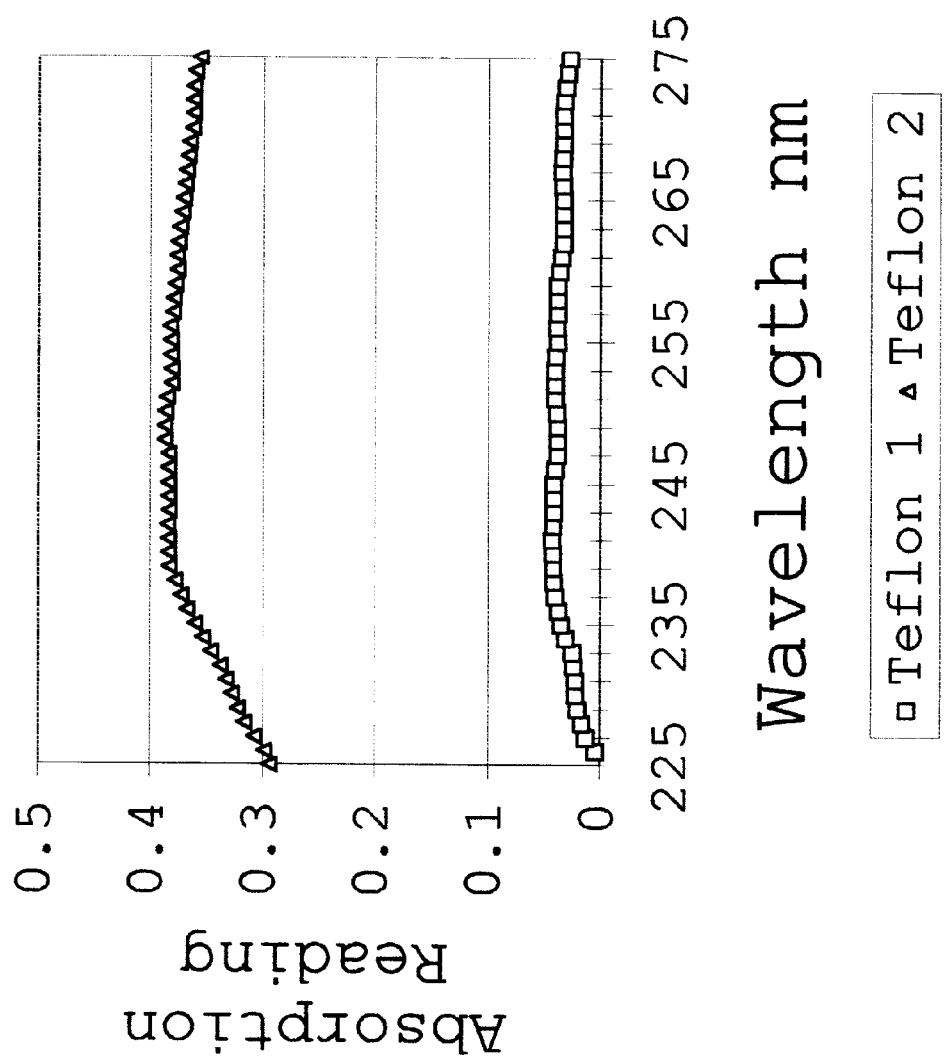
FIG. 4 is a graph of absorption versus wavelength for two different types of polymer material.

An experiment was conducted with two types of polyfluorotetraethylene to determine their suitability as carrier materials for composite dosimeters. FIG. 4 shows the absorption of ultraviolet light of the two types of polyfluorotetraethylene (Teflon) polymer. Teflon 1 is a DuPont FEP 300A clear film. Teflon 2 is a 2 mil thick ChemFab DF 100 cloudy film. The ultraviolet light transmission of polyfluorotetraethylene makes it a candidate material for production of a composite material dosimeter for crystalline solids with an F-band absorption in the ultraviolet region, such as LiF.

EXAMPLE 4

Figure 5:
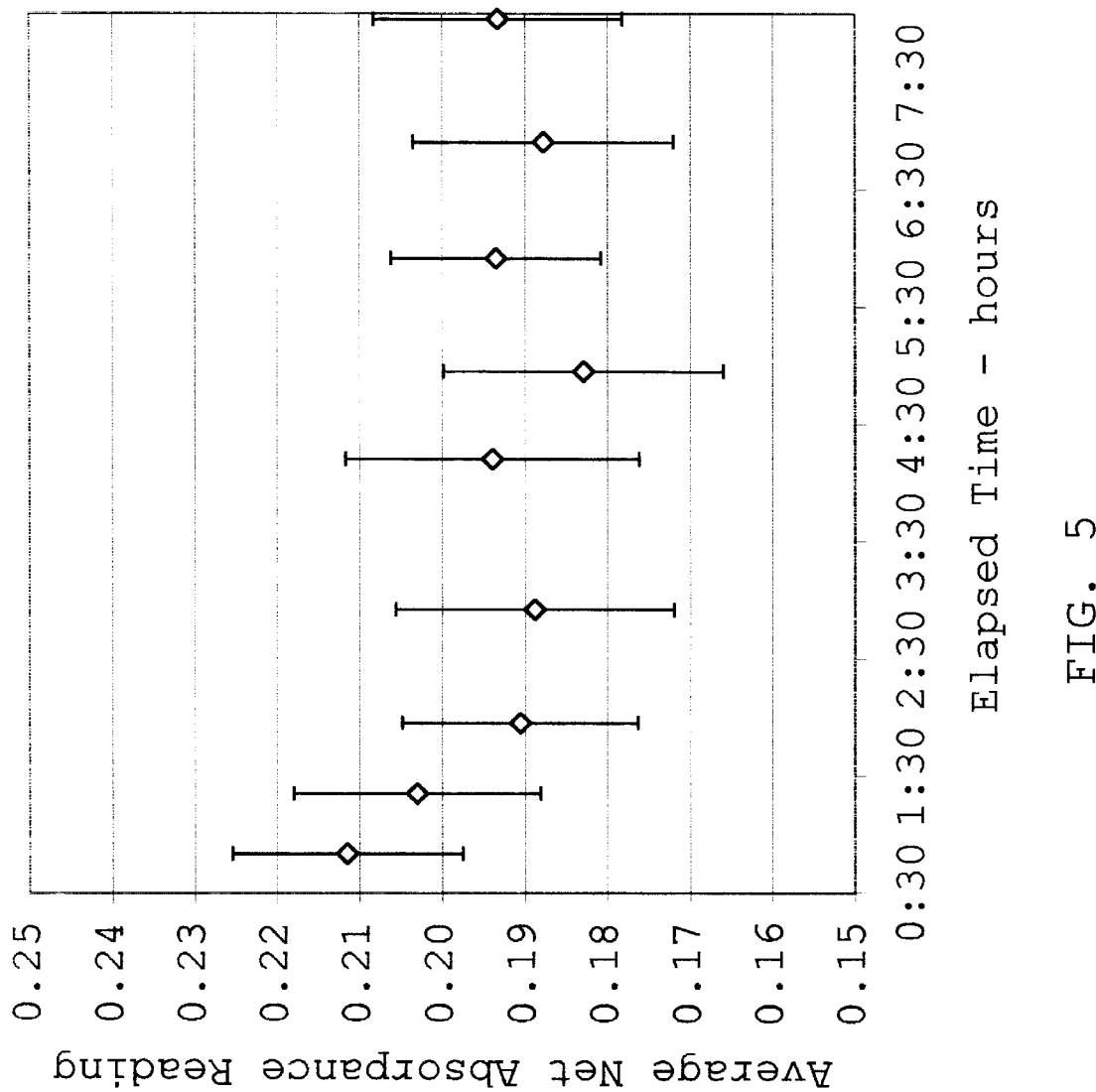
FIG. 5 is a graph of absorption versus time that shows the post irradiation effect of F-center absorption for a composite dosimeter.

FIG. 5 shows the absorption of ultraviolet light of a LiF and polyethylene composite dosimeter as a function of time after irradiation. The dosimeters described in EX. 1 were irradiated to the same dose, at constant room temperature and at a uniform and constant dose rate. FIG. 5 shows a slight post irradiation effect where the absorption decreases over time for a short period after irradiation. This post-irradiation effect stabilizes a few hours after irradiation. Any uncertainty or variation due to this post irradiation effect is within about 3%.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method of measuring ionizing radiation dose, comprising the steps of:

(a) exposing a dosimeter having lithium fluoride in a carrier matrix to ionizing radiation;

(b) illuminating the exposed dosimeter with an interrogating ultraviolet light of a wavelength less than 300 nm; and (c) counting photons of interrogating light that escape from the dosimeter.

2. The method as recited in claim 1, wherein the carrier material is a polymer which is substantially non-opaque to ultraviolet light.

3. The method as recited in claim 1, wherein the carrier material is a liquid which is substantially non-opaque to ultraviolet light and in which the lithium fluoride is substantially undissolved.

4. The method as recited in claim 2, wherein the polymer is selected from the group consisting of fluoropolymers, polyethylene, and combinations thereof.

5. The method as recited in claim 1, wherein the light is ultraviolet light with a wavelength between 240 and 255 nm.

6. The method as recited in claim 1, wherein the interrogating light is provided by a laser.

7. The method as recited in claim 6, wherein the laser is a pulsed laser.

8. A dosimeter for measuring ionizing radiation exposure, comprising:

(a) a volume of a carrier that is non-opaque to ultraviolet light from 200 nm to 300 nm containing;

(b) particles of lithium fluoride dispersed throughout the volume of the carrier.

9. The dosimeter as recited in claim 8, wherein the carrier is a polymer.

10. The dosimeter as recited in claim 8, wherein the carrier is a liquid.

* * * * *